(12) United States Patent
Jung (10) Patent No.: US 9,107,262 B2
(45) Date of Patent: Aug. 11, 2015

(54) ILLUMINATION APPARATUS INCLUDING SEMICONDUCTOR LIGHT EMITTING DIODES

(71) Applicant: Seoul Semiconductor Co., Ltd., Ansan-si (KR)

(72) Inventor: Hye Man Jung, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/344,810

(22) PCT Filed: Sep. 17, 2012

(86) PCT No.: PCT/KR2012/007409
§ 371 (c)(1),
(2) Date: Mar. 13, 2014

(87) PCT Pub. No.: WO2013/039361
PCT Pub. Date: Mar. 21, 2013

(65) Prior Publication Data
US 2014/0375224 A1   Dec. 25, 2014

(30) Foreign Application Priority Data
Sep. 16, 2011 (KR) .................. 10-2011-0093362
May 25, 2012 (KR) .................. 10-2012-0056307

(51) Int. Cl.
*H05B 37/02* (2006.01)
*H05B 33/08* (2006.01)

(52) U.S. Cl.
CPC .......... *H05B 33/0824* (2013.01); *H05B 33/083* (2013.01); *H05B 33/0809* (2013.01); *H05B 33/0848* (2013.01)

(58) Field of Classification Search
USPC .......... 315/185 R, 186, 193, 200 R, 291, 297, 315/307, 308
See application file for complete search history.

(56) References Cited

U.S. PATENT DOCUMENTS 8,054,006 B2 * 11/2011 Pastori .......................... 315/294
8,674,621 B2 *  3/2014 Ge et al. ........................ 315/294
2010/0259194 A1* 10/2010 Jacobs et al. .................. 315/307

FOREIGN PATENT DOCUMENTS

JP     2008-077892     4/2008
JP     2011-035368     2/2011
(Continued)

OTHER PUBLICATIONS

International Search Report issued on Feb. 8, 2013 in International Application No. PCT/KR2012/007409.

*Primary Examiner* — Tung X Le
(74) *Attorney, Agent, or Firm* — H.C. Park & Associates, PLC (57) ABSTRACT

An illumination apparatus capable of controlling current amounts of LEDs and enabling various electrical connections is provided. An applied driving voltage is divided, and a divided voltage is compared with a reference voltage to generate sampling signals. A logic operation is performed on the sampling signals to generate a switch control signal and a current control signal. The switch control signal controls electrical connection of LEDs to which the driving voltage is applied. Also, the current control signal may select LEDs that are to perform light emitting operations. A target voltage is set by processing the sampling signals and used to determine driving currents of the LEDs that are to perform the light emitting operations.

14 Claims, 7 Drawing Sheets

(56) References Cited

FOREIGN PATENT DOCUMENTS

| KR | 10-0936815 | 1/2010 |
| KR | 10-0940042 | 2/2010 |
| KR | 10-2011-0072692 | 6/2011 |

\* cited by examiner

ILLUMINATION APPARATUS INCLUDING SEMICONDUCTOR LIGHT EMITTING DIODES

CROSS-REFERENCE TO RELATED APPLICATIONS

This application is the National Stage Entry of International Application PCT/KR2012/007409, filed on Sep. 17, 2012, and claims priority from and the benefit of Korean Patent Application No. 10-2011-0093362, filed on Sep. 16, 2011 and Korean Patent Application No. 10-2012-0056307, filed on May 25, 2012, which are incorporated herein by reference for all purposes as if fully set forth herein.

BACKGROUND

1. Field

Example embodiments of the present invention relate in general to the field of an illumination apparatus using semiconductor light emitting diodes (LEDs) as a light source, and more specifically to an illumination apparatus using semiconductor LEDs that can enable all LEDs to emit light in consideration of fluctuations in the magnitude of an alternating current (AC) voltage when a plurality of LEDs are driven using the AC voltage.

2. Discussion of the Background

In recent years, a semiconductor light emitting diode (LED) has been utilized as a light source in many fields due to its various characteristics, such as high efficiency, low power, and high luminance. In particular, the use of illumination systems adopting semiconductor LEDs instead of conventional incandescent light bulbs or fluorescent lamps in the field of illumination has rapidly increased in recent times.

Since conventional illumination apparatuses using incandescent light bulbs or fluorescent lamps as light sources emit light using commercially available alternating current (AC) voltage, semiconductor LEDs for illumination also should be capable of being driven using an AC voltage.

Typically, to drive semiconductor LEDs using an AC voltage, a circuit may be configured to convert an AC voltage having positive and negative values into a rectifying current voltage having a positive value, and to adjust the number of emitting semiconductor LEDs with fluctuations in the magnitude of the rectifying current voltage.

In the above-described typical technique, with fluctuations in the magnitude of the rectifying current voltage, some of the plurality of semiconductor LEDs may continuously emit light over an extended light emitting time, while some of the remaining semiconductor LEDs emit light only when the magnitude of the rectifying current voltage is equal to or higher than a specific value. Thus, semiconductor LEDs constituting an illumination apparatus may have different light emitting times. As a result, some of the semiconductor LEDs constituting the illumination apparatus may wear out earlier than the others, thereby deteriorating a light emitting state of the illumination apparatus and even preventing operation of the illumination apparatus.

SUMMARY OF THE INVENTION

Accordingly, example embodiments of the present invention are provided to substantially obviate one or more problems due to limitations and disadvantages of the related art.

Example embodiments of the present invention provide an illumination apparatus using semiconductor light emitting diodes (LEDs) that can enable all the LEDs to emit light in consideration of fluctuations in the magnitude of an alternating current (AC) voltage for driving the LEDs.

In some example embodiments, an illumination apparatus includes a rectifier configured to receive AC power and generate a driving voltage in the form of a rectifying current voltage, a control signal generator configured to compare the driving voltage with a predetermined reference voltage to generate a sampling signal, and configured to perform a logic operation on the sampling signal to generate a switch control signal and a current control signal, a switch unit configured to perform on/off operations in response to the switch control signal and selectively transmit the driving voltage, a total current controller configured to receive the sampling signal and generate a target voltage as an analog signal, a current controller configured to be enabled in response to the current control signal and having a plurality of driving current controllers configured to receive the target voltage and determine a driving current, and a light emitting unit connected to the current controller and having light emitting diodes (LEDs) configured to perform a light emitting operation.

According to the present invention, an electrical connection relationship among the plurality of LEDs can be appropriately changed with fluctuations in the magnitude of an AC voltage for driving the plurality of LEDs, so that all of the plurality of LEDs employed in the illumination apparatus can emit light.

According to the present invention, all of the plurality of LEDs can emit light, thereby preventing some of the LEDs employed in the illumination apparatus from emitting light for a longer time and deteriorating earlier than the other LEDs.

Furthermore, according to the present invention, when necessary, the total current supplied to all the LEDs can be controlled to be constant or current supplied to each of the LEDs can be controlled to be constant.

While the example embodiments of the present invention and their advantages have been described in detail, it should be understood that various changes, substitutions and alterations may be made herein without departing from the scope of the invention.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF THE ILLUSTRATED EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Various example embodiments will now be described more fully with reference to the accompanying drawings in which some example embodiments are shown. The present invention may, however, be embodied in different forms and should not be construed as limited to the embodiments set forth herein. Rather, these embodiments are provided so that this disclosure is thorough and complete and fully conveys the scope of the present invention to one skilled in the art. Also, since terms are defined in consideration of functions of the present invention, they may vary according to users' intentions or practice. Hence, the terms should not be interpreted as limiting technical components of the present invention.

Embodiment 1

Figure 1:
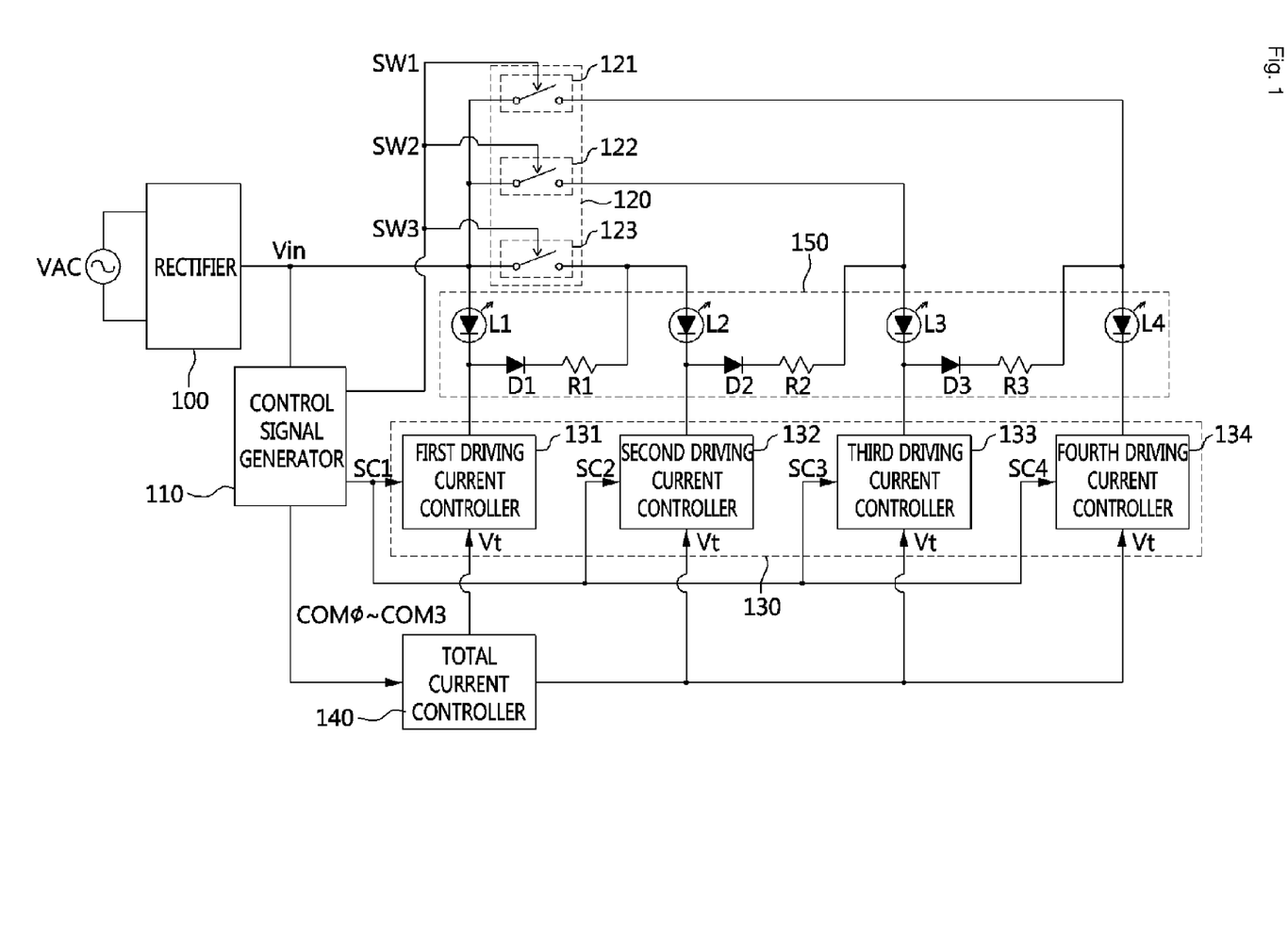
FIG. 1 is a circuit diagram of an illumination apparatus using a semiconductor light emitting diode (LED) according to a first example embodiment of the present invention.

FIG. 1 is a circuit diagram of an illumination apparatus using a semiconductor LED according to a first example embodiment of the present invention.

FIG. 1 illustrates an example of the illumination apparatus that adopts four LEDs L1 to L4. However, the present invention is not limited by the number of LEDs, and it would be apparent to those skilled in the art that the illumination apparatus of FIG. 1 may be modified into an illumination apparatus according to another example embodiment that uses at least two LEDs connected in series or an LED including a plurality of light emitting chips connected in series or parallel.

As shown in FIG. 1, an illumination apparatus using a semiconductor LED according to an example embodiment of the present invention may include a rectifier 100, a control signal generator 110, a switching unit 120, a current controller 130, a total current controller 140, and a light emitting unit 150.

The rectifier 100 may rectify an AC voltage VAC having positive and negative values and convert the rectified AC voltage into a driving voltage Vin in the form of a rectifying current voltage. One of various known rectifier circuits, such as a diode bridge circuit including diodes, may be adopted as the rectifier 100.

The control signal generator 110 may receive the driving voltage Vin, generate switch control signals SW1 to SW3 for controlling on/off operations of the switch unit 120, generate current control signals SC1 to SC4 for controlling operations of the current controller 130, and generate sampling signals COM0 to COM3 for determining a target voltage Vt, which is an output of the total current controller 140.

The switch unit 120 may include a plurality of switches 121, 122, and 123 connected in parallel to one another, and perform on/off operations in response to the switch control signals SW1 to SW3. Thus, the driving voltage Vin may be selectively applied to the LEDs L2 to L4.

The current controller 130 may be connected to a cathode terminal of each of the LEDs L1 to L4 and control operations of the connected LEDs in response to the current control signals SC1 to SC4. Also, the target voltage Vt may be applied to the current controller 130. Current amounts of the LEDs L1 to L4 connected to the current controller 130 may be determined according to the applied target voltage Vt.

To this end, the current controller 130 may include a plurality of driving current controllers 131, 132, 133, and 134. The driving current controllers 131, 132, 133, and 134 may be connected in parallel to one another.

For example, the first driving current controller 131 may receive a current control signal SC1 and a target voltage Vt. The first driving current controller 131 may be enabled or disabled in response to the current control signal SC1. When enabled, the first driving current controller 131 may allow a driving current corresponding to the target voltage Vt to flow through the LED L1.

The total current controller 140 may receive sampling signals COM0 to COM3 of the control signal generator 110 and convert the sampling signals COM0 to COM3 into analog signals. The converted analog signals may be applied in the form of the target voltage Vt to the current controller 130.

The light emitting unit 150 may include a plurality of LEDs L1 to L4 and a plurality of diodes D1 to D3. For example, the LED L1 may be connected between the driving voltage Vin and the first driving current controller 131. Also, the remaining LEDs L2 to L4 may be connected between the switch unit 120 and the driving current controllers 132, 133, and 134. For instance, the LED L1 may be expressed as a first light emitting group, and the remaining LEDs L2 to L4 may be expressed as a second light emitting group. The first light emitting group may be directly connected to the driving voltage Vin and perform a light emitting operation. Conversely, the second light emitting group may receive the driving voltage Vin only when each of the switches 121, 122, and 123 of the switch unit 120 is in a conduction state.

Figure 2:
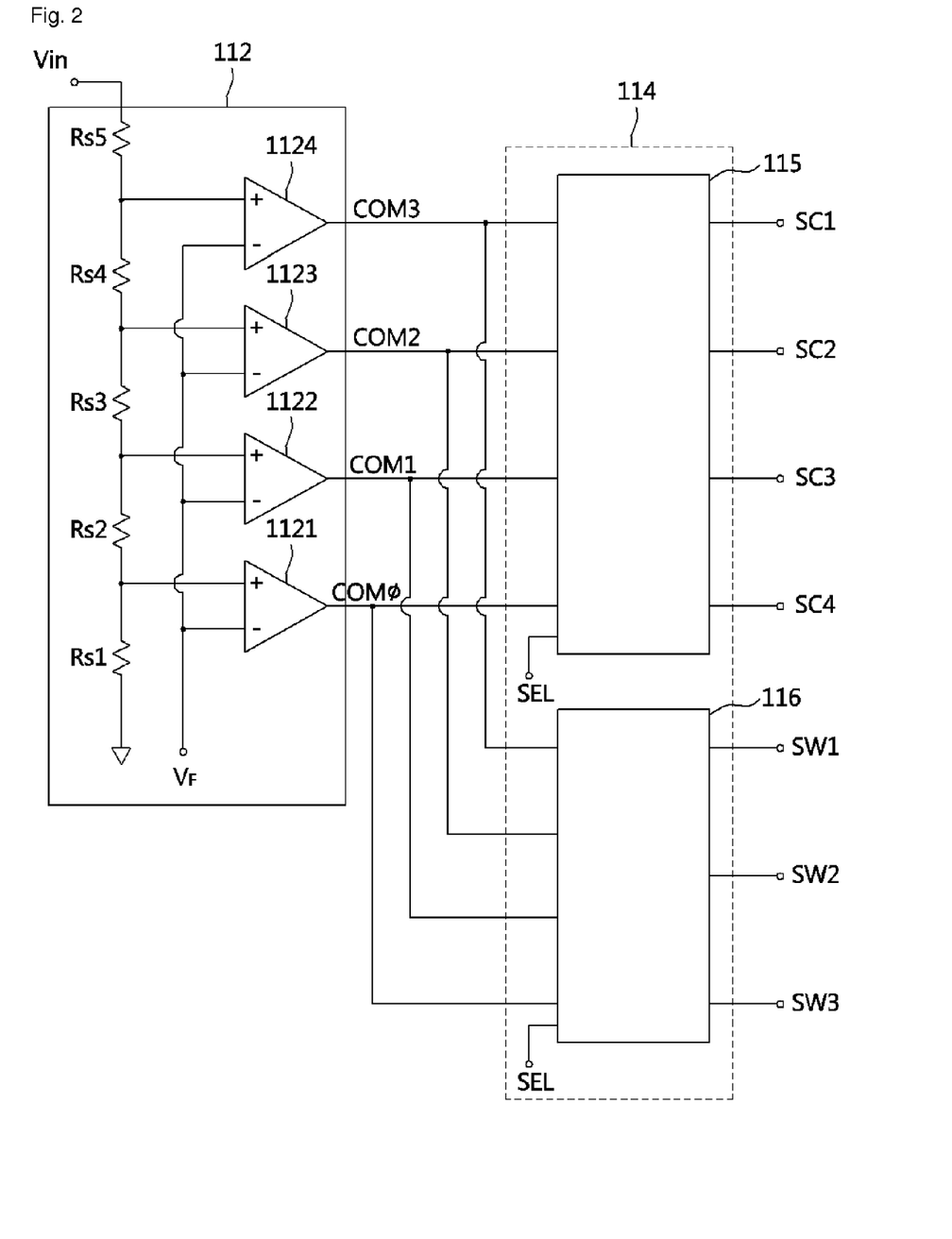
FIG. 2 is a circuit diagram of a control signal generator of FIG. 1.

FIG. 2 is a circuit diagram of the control signal generator of FIG. 1.

Referring to FIG. 2, the control signal generator may include a comparison unit 112 and a logic combination unit 114.

The comparison unit 112 may receive the driving voltage Vin output from the rectifier 100 and compare the driving voltage Vin with a reference voltage VF. A comparison result may be indicated by levels of the sampling signals COM0 to COM3. To this end, the comparison unit 112 may include a plurality of voltage division resistors Rs1 to Rs5 connected in series between the driving voltage Vin and ground. Also, branches from nodes between the voltage division resistors Rs1 to Rs5 may be applied to the comparators 1121 to 1124. Voltages of the nodes between the voltage division resistors Rs1 to Rs5 may be applied to positive input terminals of the comparators 1121 to 1124, and the reference voltage VF may be applied in common to negative input terminals of the comparators 1121 to 1124.

When the voltages of the nodes between the voltage division resistors Rs1 to Rs5 applied to the positive input terminals of the respective comparators 1121 to 1124 are higher than the reference voltage VF applied to the negative input terminals thereof, the comparators 1121 to 1124 may output high-level signals. Also, when the voltages of the nodes between the voltage division resistors Rs1 to Rs5 applied to the positive input terminals of the respective comparators 1121 to 1124 are lower than the reference voltage VF applied to the negative input terminals thereof, the comparators 1121 to 1124 may output low-level signals.

The logic combination unit 114 may include a first logic unit 115 and a second logic unit 116.

The first logic unit 115 may receive the sampling signals COM0 to COM3 output by the respective comparators 1121 to 1124, perform logic combination operations on the sampling signals COM0 to COM3, and generate current control signals SC1 to SC4. The current control signals SC1 to SC4 may control operations of the current controller 130 of FIG. 1. The first logic unit 115 may include a combination of various logic devices according to signals of inputs and outputs. Also, a selection signal SEL may be applied to the first logic unit 115. The selection signal SEL may select a sampling signal on which a logic operation will be performed.

The second logic unit 116 may receive the sampling signals COM0 to COM3, perform logic combination operations on the sampling signals COM0 to COM3, and generate switch control signals SW1 to SW3. Each of the switch control signals SW1 to SW3 may control the switch unit 120 of FIG. 1. The second logic unit 116 may include a combination of various logic devices according to signals of inputs and outputs. Also, the selection signal SEL may be applied to the second logic unit 116. The selection signal SEL may select a predetermined sampling signal on which a logic operation will be performed.

Each of the first logic unit 115 and the second logic unit 116 may include a combination of logic devices, which may be variously selected according to phases of the input sampling signals COM0 to COM3 and phases of the switch control signals SW1 to SW3 or current control signals SC1 to SC4. For example, each of the two logic units 115 and 116 may include a programmable logic array or programmable array logic.

Also, the number of sampling signals may not be specifically limited but may be variously selected according to the number of output switch control signals and the number of current control signals.

Figure 3:
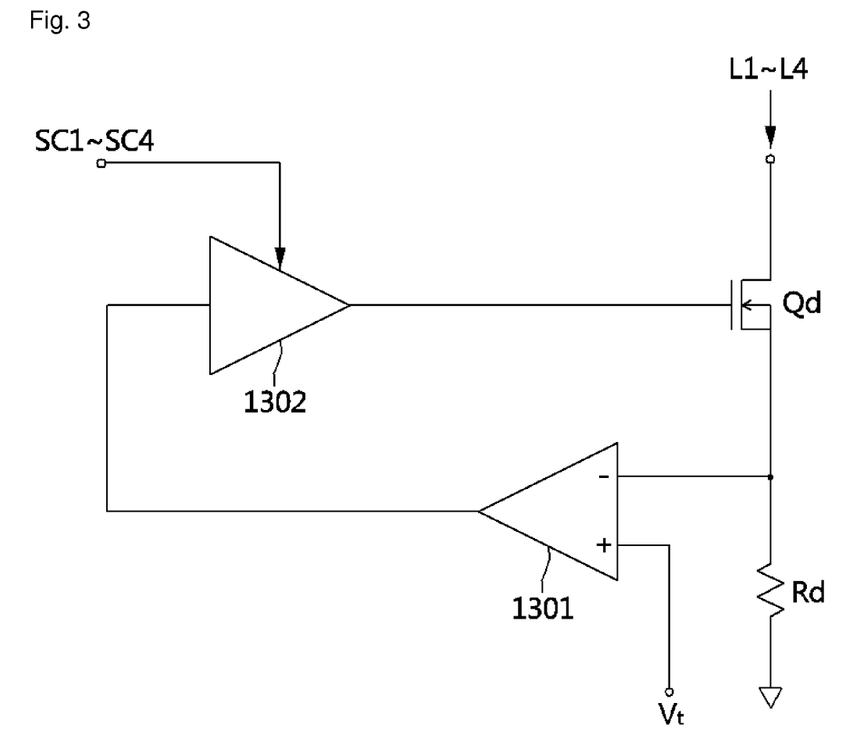
FIG. 3 is a circuit diagram of respective components of a current controller of FIG. 1.

FIG. 3 is a circuit diagram of respective components of the current controller of FIG. 1.

The circuit diagram of FIG. 3 illustrates any one of four driving current controllers constituting the current controller.

Referring to FIG. 3, the driving current controller may include a linear amplifier 1301, a buffer 1302, a driving transistor Qd, and a detection resistor Rd.

A voltage detected by the detection resistor Rd may be applied to a negative input terminal of the linear amplifier 1301. Also, the target voltage Vt may be applied to a positive input terminal of the linear amplifier 1301. The target voltage Vt may be a voltage generated by the total current controller 140 of FIG. 1. An output of the linear amplifier 1301 may be applied to the buffer 1302. The buffer 1302 may be enabled or disabled in response to the current control signals SC0 to SC3.

The term "enabling" refers to performing, by a target element, an input/output (I/O) function. Also, the term "disabling" refers to entering, by a target element, an off state or floated state without performing functions. Accordingly, during a disabling mode, the processing or transmission of signals may not occur. Hereinafter, the meanings of enabling and disabling in the present invention should be interpreted as described above.

The enabled buffer 1302 may transmit the output of the linear amplifier 1301 to the drive transistor Qd. The drive transistor Qd may be connected between the cathode terminal of each of the LEDs L1 to L4 and the detection resistor Rd. Also, the drive transistor Qd may perform on/off operations in response to the output of the buffer 1302 applied to a gate terminal thereof. The buffer 1302 may be any device configured to be capable of on/off operations in response to the current control signal SC. Accordingly, the buffer 1302 may be replaced by a switch.

When the buffer 1302 is enabled, a negative feedback including the drive transistor Qd, the linear amplifier 1301, and the buffer 1302 may be formed. When a detection voltage of the detection resistor Rd is lower than the target voltage Vt, the linear amplifier 1301 may output a high-level signal, which may be applied through the buffer 1302 to the gate terminal of the drive transistor Qd. A gate-source voltage Vgs of the drive transistor Qd may increase due to the increased voltage level. Thus, the amount of current flowing through the detection resistor Rd may increase. A detection voltage of the detection resistor Rd may increase due to the increased amount of current. That is, the detection voltage of the detection resistor Rd may be characterized by following the target voltage Vt.

When the buffer 1302 is disabled, the buffer 1302 may output a low-level signal or enter a floated state so that the drive transistor Qd may enter an off state.

As a result, no current may be supplied to the driving current controller.

Figure 4:
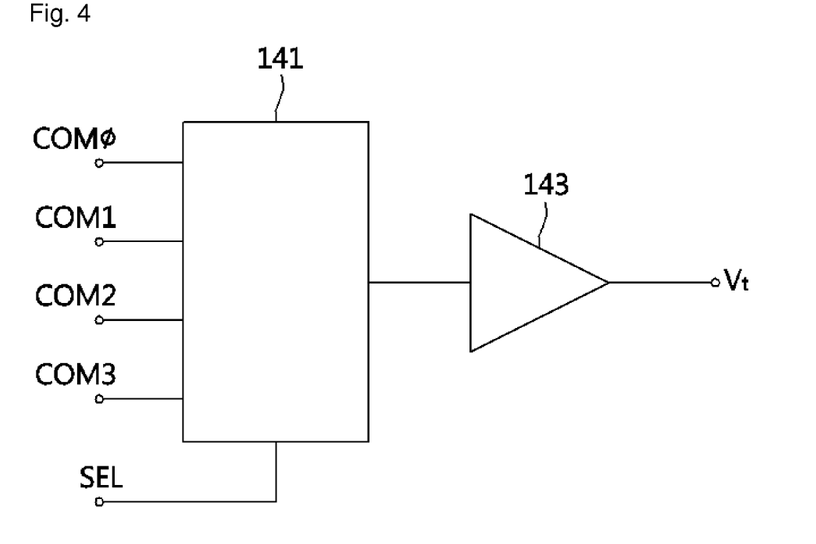
FIG. 4 is a block diagram of a total current controller of FIG. 1.

FIG. 4 is a block diagram of the total current controller 140 of FIG. 1.

Referring to FIG. 4, the total current controller 140 may include a digital-to-analog converter (DAC) 141 configured to receive the sampling signals COM0 to COM3 generated by the control signal generator 110 shown in FIG. 2 and output a predetermined target value according to a state of each of the sampling signals COM0 to COM3. For example, the DAC 141 may receive logic values 0000 to 1111 of the sampling signals COM0 to COM3 and output a voltage corresponding to the predetermined target value in response to each of the logic values 0000 to 1111. The target voltage Vt corresponding to the target value may be input through the buffer 143 to the linear amplifier 1301 of each of the driving current controllers 131, 132, 133, and 134.

In addition, although FIG. 4 illustrates that the total current controller 140 outputs only one output, this is only an example. Thus, the total current controller 140 may output a plurality of outputs corresponding to the number of driving current controllers to which the target voltages Vt are applied. Also, a plurality of output target voltages Vt may have different values.

Also, the selection signal SEL may be input to the total current controller 140. When the selection signal SEL is enabled, the total current controller 140 may output different target voltages Vt.

Figure 5:
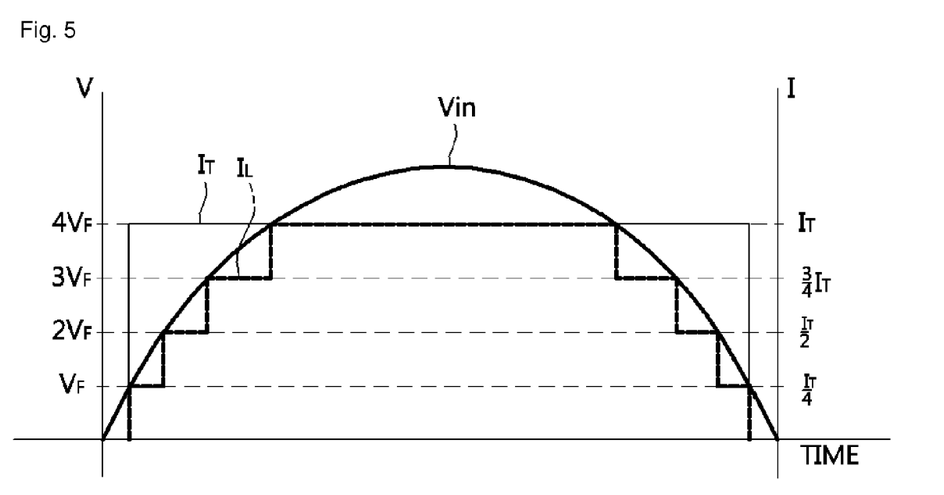
FIG. 5 is a graph for explaining operations of the illumination apparatus of FIG. 1, according to the first example embodiment of the present invention.

FIG. 5 is a graph illustrating operations of the illumination apparatus of FIG. 1, according to the first example embodiment of the present invention.

Referring to FIG. 5, a driving voltage Vin, a magnitude of the total current IT flowing through all the LEDs, and a magnitude of current IL flowing through each of the LEDs are shown.

One cycle of the driving voltage Vin in the form of a rectifying current voltage is shown. Here, the driving voltage Vin periodically increases and decreases between 0V and a peak voltage. As shown in FIG. 5, the sum of currents flowing through all the LEDs L1 to L4, that is, the magnitude of the total current IT, may be controlled to be constant.

The switch unit 120 and the current controller 130 may be controlled as shown in Table 1.

Operations shown in Table 1 according to the first embodiment will be described with reference to FIGS. 1 through 3.

For brevity, it is assumed in FIG. 2 that the resistor Rs5 is removed or has an immaterial value. Accordingly, it is assumed that the driving voltage Vin is applied to the comparator 1124 without causing a drop in the level of the driving voltage Vin.

When the driving voltage Vin output by the rectifier 100 gradually increases from 0 V to a value equal to or higher than the reference voltage VF and lower than 2 VF, the sampling signal COM3 output by the comparator 1124 may become a high-level signal. Sampling signals output by the remaining comparators 1121, 1122, and 1123 may become low-level signals. The reference voltage VF may be a forward voltage by which each LED L1 or L4 may initiate a light emitting operation.

The first logic unit 115 receiving the output of the comparison unit 112 may enable all the current control signals SC1 to SC4. Also, the second logic unit 116 may enable all the switch control signals SW1 to SW3. Thus, all the switches 121, 122, and 123 of the switch unit 120 may be turned on, while all the driving current controllers 131, 132, 133, and 134 may be enabled.

That is, in FIG. 2, the sampling signals COM0 to COM3 may be input in the form of (0001) to the first logic unit 115 and the second logic unit 116. The first logic unit 115 receiving the sampling signals COM0 to COM3d may enable all the current control signals SC1 to SC4. For example, all the current control signals SC1 to SC4 may be enabled to a high level. Also, the second logic unit 116 may enable the switch control signals SW1 to SW3. Accordingly, the first through third switches 121 to 123 may be turned on. All the LEDs L1 to L4 may be connected in parallel by the turned-on switches 121, 122, and 123 and the enabled driving current controllers 131, 132, 133, and 134.

In addition, the DAC 141 of the total current controller 140 may receive a logic signal (e.g., 0001) of the sampling signals COM0 to COM3 output by the comparison unit 112 of the control signal generator 110 and generate the target voltage Vt corresponding to the predetermined target value in response to the logic signal. In this case, the target value may be a value equal to ¼ the total current IT so as to constantly control the total current IT.

Due to the above-described operation, all the driving current controllers 131, 132, 133, and 134 and the switches 121, 122, and 123 may be put into a conduction state or enabled, and the plurality of LEDs L1 to L4 may be electrically connected in parallel to one another due to states of the driving current controllers 131, 132, 133, and 134 and the switches 121, 122, and 123. As a result, the total driving current IT may be divided by four and supplied to the respective LEDs L1 to L4.

TABLE 1

|  | First driving current controller 131 | Second driving current controller 132 | Third driving current controller 133 | Fourth driving current controller 134 | First switch 121 | Second switch 122 | Third switch 123 |
|---|---|---|---|---|---|---|---|
| VF ≤ Vin < 2VF | ON | ON | ON | ON | ON | ON | ON |
| 2VF ≤ Vin < 3VF | OFF | ON | OFF | ON | OFF | ON | OFF |
| 3VF ≤ Vin < 4VF | OFF | OFF | ON | OFF | OFF | OFF | OFF |
|  | OFF | OFF | ON | ON | ON | OFF | OFF |
| 4VF ≤ Vin | OFF | OFF | OFF | ON | OFF | OFF | OFF |

To sum up, when the driving voltage Vin is equal to or higher than the reference voltage VF, high-level current control signals SC1 to SC4 may be applied from the control signal generator 110 to the buffers 1302 of the respective driving current controllers 131, 132, 133, and 134, and the target voltage Vt corresponding to a target value equal to ¼ the total driving current IT may be applied from the total current controller 140 to the linear amplifiers 1301 of the respective driving current controllers 131, 132, 133, and 134. Thus, the linear amplifier 1301 may adjust a gate voltage of the driving transistor Qd such that a voltage applied to the detection resistor Rd is equal to the target voltage Vt so that current corresponding to ¼ the total driving current IT may flow between source and drain terminals of the driving transistor Qd. As a result, current IL corresponding to ¼ the total driving current IT may be divided and supplied to each of the LEDs L1 to L4.

When the magnitude of the driving voltage Vin output by the rectifier 100 gradually increases to a value higher than or equal to 2 VF, and lower than 3 VF, the control signal generator 110 may generate and output a switch control signal by which two of the LEDs L1 to L4 may be connected in series. That is, the two comparators 1123 and 1124 of FIG. 2 may output high-level signals.

The sampling signals COM0 to COM3 output by the comparators 1121 to 1124 may be output in the form of (0011).

In addition, the first logic unit 114 receiving the sampling signals COM0 to COM3 may enable the current control signals SC2 to SC4.

Accordingly, current flowing through the LED L2 may be supplied to the second driving current controller 132, and current supplied to the LED L4 may be supplied to the fourth driving current controller 134.

In addition, the second logic unit 116 receiving the sampling signals COM0 to COM3 may enable the switch control signal SW2. Accordingly, the second switch 122 may be turned on, while the remaining switches 121 and 123 may be turned off.

The total current controller 140 may receive the sampling signals COM0 to COM3 in the form of (0011). The input sampling signals COM0 to COM3 may be converted into analog signals and output as a target voltage Vt. The target voltage Vt may allow the driving current IL of the enabled driving current controllers 142 and 144 to be ½ the total current IT.

Due to the operations of the switch unit 120 and the current controller 130, the second switch 122 may be turned on, and the second driving current controller 142 and the fourth driving current controller 144 may be enabled. Thus, a current path including the LED L1, the diode D1, the LED L2, and the second driving current controller 142 may be formed, and another current path including the LED L3, the diode D3, the LED L4, and the fourth driving current controller 144 may be formed.

As a result, the total driving current IT may be halved and supplied to the respective current paths.

When the driving voltage Vin output by the rectifier 100 is higher than or equal to 3 VF, and lower than 4 VF, the control signal generator 110 may generate switch control signals SW1 to SW3 by which three of the LEDs L1 to L4 may be connected in series, and output current control signals SC1 to SC4.

The sampling signals COM0 to COM3 output by the comparison unit 112 of the control signal generator 110 may be output in the form of (0111). This means that the sampling signal COM0 is a low-level signal, and the remaining sampling signals COM1 to COM3 are high-level signals.

The first logic unit 115 receiving the sampling signals COM0 to COM3 may enable the current control signal SC3. Thus, only the third driving current controller 133 may be enabled and the remaining driving current controllers 131, 132, and 134 disabled.

Also, the second logic unit 116 receiving the sampling signals COM0 to COM3 may disable all the switch control signals SW1 to SW3. Accordingly, all the switches 121, 122, and 123 of the switch unit 120 may be turned off.

Thus, a current path including the LED L1, the diode D1, the LED L2, the diode D2, the LED L3, and the third driving current controller 133 may be formed. Accordingly, three LEDs L1, L2, and L3 of FIG. 1 may perform light emitting operations.

Furthermore, the total current controller 140 may receive the sampling signals COM0 to COM3 and convert the sampling signals COM0 to COM3 into the target voltages Vt. That is, the total current controller 140 may receive the logic signal (0111) and generate the target voltage Vt in response to the logic signal (0111). Since only the three LEDs L1, L2, and L3 connected in series are operated in response to the generated target voltage Vt, a level of the generated target voltage Vt may have a value corresponding to the total current.

In addition, the LED L4, which is not connected in series to the LEDs L1, L2, and L3, may selectively emit light. To this end, an externally input selection signal SEL may be applied to the first and second logic units 115 and 116 of the control signal generator 110. When the selection signal SEL is enabled, the first logic unit 115 may enable the current control signals SC3 and SC4. Thus, the third driving current controller 133 and the fourth driving current controller 134 may be enabled. Also, the second logic unit 116 may receive the enabled selection signal SEL, perform a logic operation on the enabled selection signal SE, and enable the switch control signal SW1. Accordingly, the first switch 120 may be turned on.

Thus, a current path including the LED L1, the diode D1, the LED L2, the diode D2, the LED L3, and the third driving current controller 133 may be formed, and another current path including the LED L4 and the fourth driving current controller 134 may be formed.

In addition, the selection signal SEL may be applied to the total current controller 140. The DAC 141 constituting the total controller 140 may receive the selection signal SEL in addition to the sampling signals COM0 to COM3 of the control signal generator 110. When the selection signal SEL is enabled, the total current controller 140 may generate two kinds of target voltages. For instance, the total current controller 140 may process the sampling signals COM0 to COM3 to generate a target voltage Vt1 applied to the third driving current controller 133, and generate a target voltage Vt2 applied to the fourth driving current controller 134 sing the sampling signals COM0 to COM3 and the selection signal SEL.

The target voltage Vt1 applied to the third driving current controller 133 may be set as a value corresponding to ¾ the total driving current IT, and the target voltage Vt2 applied to the fourth driving current controller 134 may be set as a value corresponding to ¼ the total driving current IT.

When the driving voltage Vin, which is an output voltage of the rectifier 100, is at least 4 times the reference voltage VF, all the comparators 1121 to 1124 of the control signal generator 110 may generate high-level signals. Accordingly, the sampling signals COM0 to COM3 may have a logic value (1111).

The first logic unit 115 receiving the sampling signals COM0 to COM3 may enable the current control signal SC4.

Thus, the fourth driving current controller 134 may be enabled. Also, the second logic unit 116 receiving the sampling signals COM0 to COM3 may disable all switch control signals. Accordingly, all the switches 121, 122, and 123 of the switch unit 120 may be turned off.

Accordingly, in FIG. 1, a current path including the LED L1, the diode D1, the LED L2, the diode D2, the LED L3, the diode D3, the LED L4, and the fourth driving current controller 134 may be formed.

Also, the total current controller 140 may receive the sampling signals COM0 to COM3 output by the comparison unit 112 of the control signal generator 110 and convert the sampling signals COM0 to COM3 into a target voltage Vt, which is an analog signal. The target voltage Vt may be applied to the fourth driving current controller 134, which may drive current corresponding to the total current driving current IT.

Referring to FIG. 5, the magnitude of the total current IT may be controlled to be constant in the form of one square wave. Even if the driving voltage Vin varies, the total current IT may be appropriately divided and supplied to respective LEDs. Current flowing through each of the LEDs may vary according to a level of the driving voltage Vin. In the above-described case, the average amounts of power supplied to the respective LEDs may be equalized, and a power factor and critical conditions may be satisfied.

Figure 6:
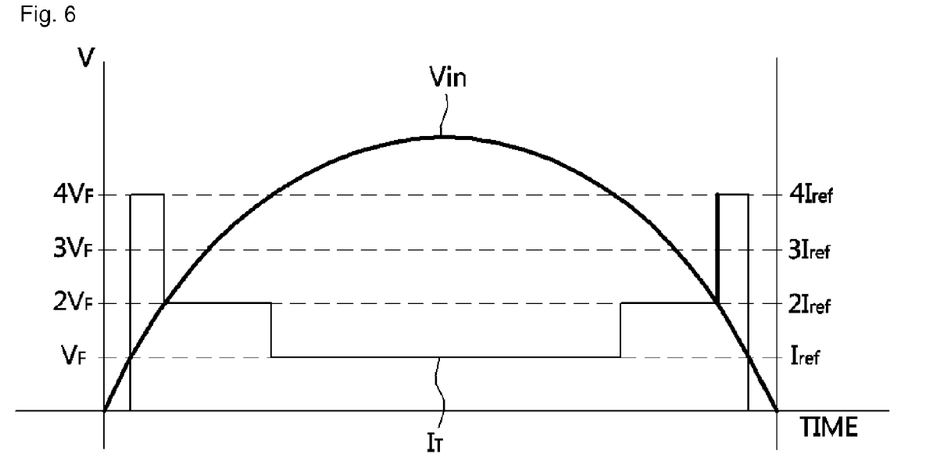
FIG. 6 is another graph for explaining operations of the illumination apparatus of FIG. 1, according to the first example embodiment of the present invention.

FIG. 6 is another graph illustrating operations of the illumination apparatus of FIG. 1, according to the first example embodiment of the present invention.

Referring to FIG. 6, a driving voltage Vin, a magnitude of the total current IT flowing through all the LEDs, and a magnitude of current IL flowing through each of the LEDs are shown.

Although the operations described with reference to FIG. 5 are characterized by constantly controlling the magnitude of the total current IT, in FIG. 6, even if switching conditions are changed, the magnitude of current IL flowing through each of the LEDs is controlled to be constant to maintain a constant light emitting amount.

Since the switching conditions are the same as in Table 1, a description thereof will be omitted. Also, an equal amount of current flows through each of the LEDs, a process of generating the target voltage Vt using sampling signals may be omitted. Accordingly, in addition to generation of the target voltage Vt using the total current controller 140, the target voltage Vt may be applied to the respective driving current controllers 131, 132, 133, and 134 using an additional supply voltage.

To begin with, when the driving voltage Vin output by the rectifier 100 gradually increases from 0V to a value equal to or higher than the reference voltage VF and lower than 2 VF, the four LEDs L1 to L4 may be connected in parallel to one another.

In this case, the total current controller 140 may supply the target voltage Vt such that a predetermined reference current Iref is supplied to each of the driving current controllers 131, 132, 133, and 134. Thus, the reference current Iref may flow through each of the LEDs, and the total current amount may become 4 Iref.

Subsequently, when the driving voltage Vin output by the rectifier 100 reaches a value equal to or higher than 2 VF and lower than 3 VF, an array including two LEDs L1 and L2 connected in series and an array including two LEDs L3 and L4 connected in series may be connected in parallel to each other. In this case, the total current controller 140 may supply the target voltage Vt to the second driving current controller 132 and the fourth driving current controller 134. Thus, the reference current Iref may flow through the LEDs L1 and L2 connected in series and also flow through the LEDs L3 and L4 connected in series. Accordingly, the total current amount may become 2 Iref.

Thereafter, when the driving voltage Vin output by the rectifier 100 reaches a value equal to or higher than 3 VF, and lower than 4 VF, an array including three LEDs L1 to L3 connected in series may be connected in parallel to one LED L4. The total current controller 140 may supply the target voltage Vt to the third driving current controller 133 and the fourth driving current controller 134. Each of the driving current controllers 133 and 134 may drive the reference current Iref. Accordingly, the total current amount may become 2 Iref.

Thereafter, when the magnitude of the driving voltage Vin output by the rectifier 100 is 4VF or higher, all the LEDs L1 to L4 may be connected in series. The total current controller 140 may supply the target voltage Vt to the fourth driving current controller 134. According, the total current amount may become Iref.

As shown in FIG. 6, the total current IT may vary according to the magnitude of the driving voltage Vin. Also, current flowing through one LED may be always controlled to be constant. In this case, the average amounts of power supplied to the respective LEDs may differ from one another. However, even if a connection relationship among the respective LEDs is changed, since light emitting amounts of the respective LEDs are always maintained constant, the illumination apparatus can maintain constant brightness.

Embodiment 2

Figure 7:
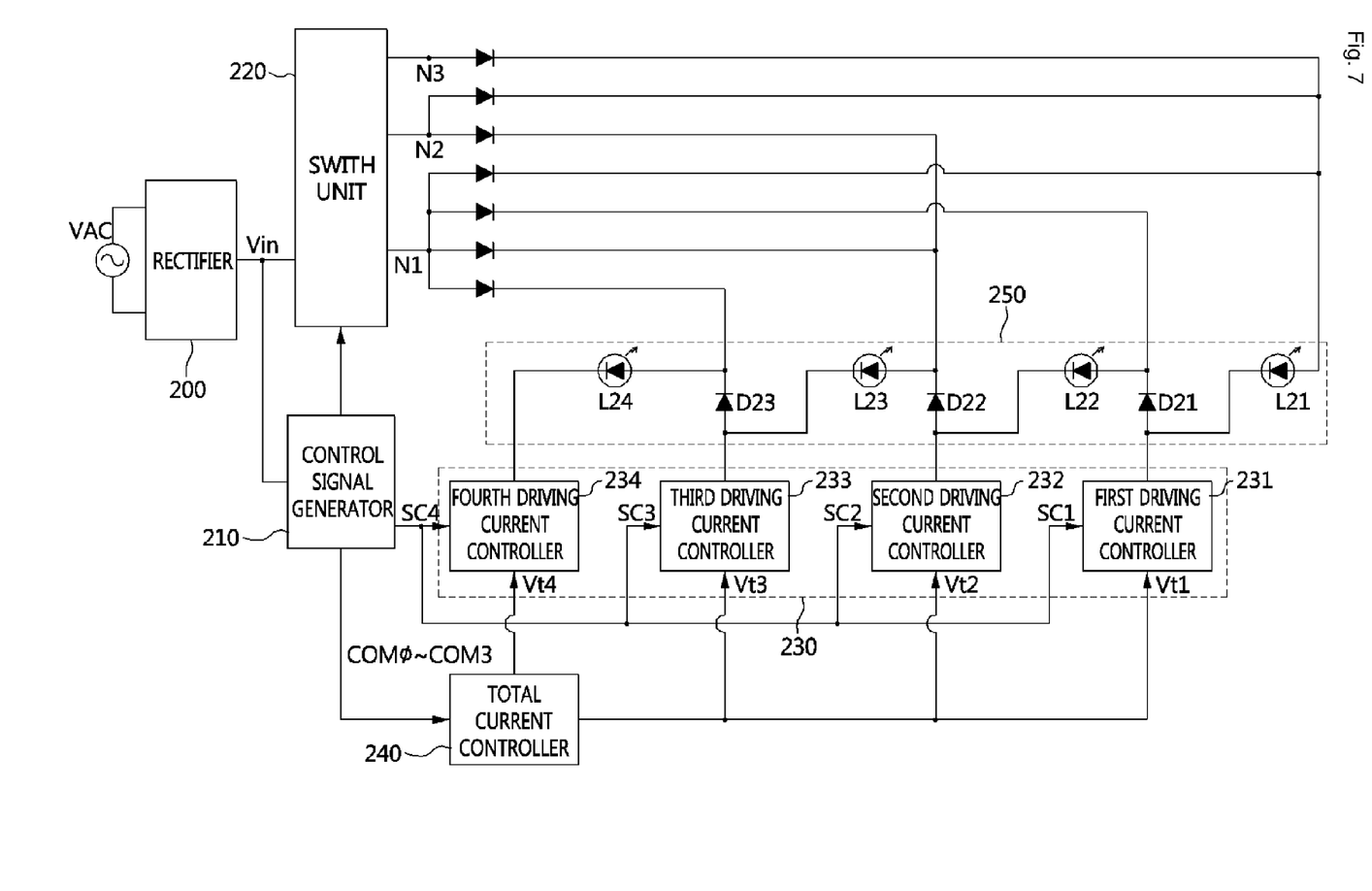
FIG. 7 is a circuit diagram of an illumination apparatus using a semiconductor LED according to a second example embodiment of the present invention.

FIG. 7 is a circuit diagram of an illumination apparatus using a semiconductor LED according to a second example embodiment of the present invention.

FIG. 7 illustrates an example of the illumination apparatus that adopts four LEDs. However, the present invention is not limited by the number of LEDs, and each of the LEDs may be one LED obtained by modeling a serial connection structure of at least two LEDs, a parallel connection structure of at least two LEDs, or a mixture of serial and parallel connection structures.

In addition, the illumination apparatus according to the present embodiment may include a rectifier 200, a control signal generator 210, a switch unit 220, a current controller 230, a total current controller 240, and a light emitting unit 250.

The rectifier 200 may rectify an AC voltage having positive and negative values and convert the AC voltage into a driving voltage Vin in the form of a rectifying current voltage. One of various known rectifier circuits, such as a diode bridge circuit including diodes, may be adopted as the rectifier 200.

The control signal generator 210 may detect the driving voltage Vin and generate sampling signals COM0 to COM1, switch control signals SW1 to SW3, and current control signals SC1 to SC4 according to the magnitude of the detected driving voltage Vin. The sampling signals COM0 to COM3 may be applied to the total current controller 240, and the switch control signals SW1 to SW3 may be applied to the switch unit 220. Also, the current control signals SC1 to SC4 may be respectively applied to driving current controllers 231 to 234 of the current controller 230.

The switch unit 220 may be provided between the driving voltage Vin and the light emitting unit 250. Also, the switch unit 220 may include a plurality of switches, each of which may have a short circuit or be opened in response to the switch control signals SW1 to SW3.

The current controller 230 may include a plurality of driving current controllers 231, 232, 233, and 234. The driving current controllers 231, 232, 233, and 234 may be respectively connected to cathode terminals of the LEDs L21, L22, L23, and L24. The current control signals SC1 to SC4 may be applied to the driving current controllers 231, 232, 233, and 234. The driving current controllers 231, 232, 233, and 234 may be enabled or disabled in response to the applied current control signals SC1 to SC4.

For example, when the current control signals SC1 to SC4 are enabled to a high level, the driving current controllers 231, 232, 233, and 234 may have predetermined current drivability and perform operations. Conversely, when the current control signals SC1 to SC4 are disabled to a low level, the driving current controllers 231, 232, 233, and 234 may be put into a high-impedance state or floated state and may not perform current drive operations. Also, the target voltages Vt1 to Vt4 may be applied to the driving current controllers 231, 232, 233, and 234. When the driving current controllers 231, 232, 233, and 234 remain enabled, the target voltages Vt1 to Vt4 may determine the amount of current by which the illumination apparatus is driven.

The driving current controllers 231 to 234 constituting the current controller 230 may be the same as described in the first embodiment. Thus, a description thereof will be omitted here.

Accordingly, when the current control signals SC1 to SC4 are enabled, a buffer may be enabled and receive the output of an amplifier. The output of the amplifier may change a gate-source voltage Vgs of a transistor via the buffer. The changed gate-source voltage Vgs may vary a driving current. The varied driving current may flow through a detection resistor, and a voltage detected by the detection resistor may be applied to a negative input terminal of the amplifier. The voltage detected by the detection resistor may be characterized by following a target voltage applied to a positive input terminal of the amplifier.

Therefore, as the target voltage increases, a driving current set by each of the driving current controllers 231 to 234 may also increase.

The total current controller 240 may receive sampling signals COM0 to COM3 of the control signal generator 210. The sampling signals COM0 to COM3 may be input in the form of digital data. Accordingly, the total current controller 240 may perform DAC operations and generate target voltages Vt1 to Vt4. The target voltages Vt 1 to Vt4 may be respectively input to the driving current controllers 231, 232, 233, and 234. The target voltages Vt1 to Vt4 may have the same value or different values.

The light emitting unit 250 may include a first LED L21, a second LED L22, a third LED L23, and a fourth LED L24. Also, the light emitting unit 250 may be connected between the switch unit 220 and the current controller 230. Cathode electrodes of the LEDs L21, L22, L23, and L24 may be respectively connected to the driving current controllers 231, 232, 233, and 234. Also, diodes D21, D22, and D23 may be connected among the LEDs L21, L22, L23, and L24. The diodes D21, D22, and D23 may have a forward connection relationship among the LEDs L21, L22, L23, and L24. For example, when the first LED L21 and the second LED L22 are electrically connected in series, the diode D21 connected between the two LEDs L21 and L22 may supply current from the first LED L21 to the second LED L22 through a forward connection structure. Also, the diodes D21, D22, D23, and D24 may be connected in a reverse direction in a current path from the switch unit 220 toward the current controller 230. As a result, direct application of the driving voltage Vin through the switch unit 220 to the current controller 230 may be prevented.

Figure 8:
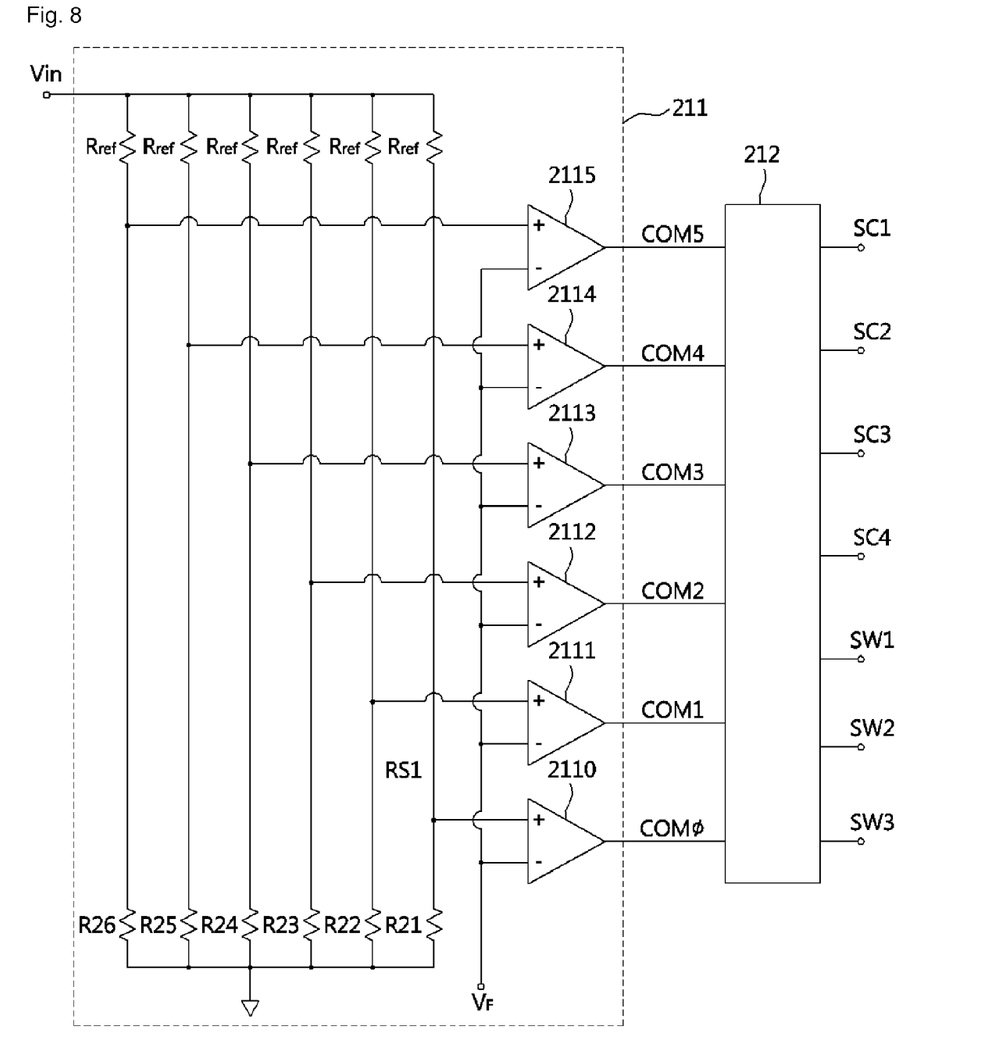
FIG. 8 is a circuit diagram of a control signal generator according to the second example embodiment of the present invention.

FIG. 8 is a circuit diagram of the control signal generator 210 according to the second example embodiment of the present invention.

Referring to FIG. 8, the control signal generator 210 may include a comparison unit 211 and a logic combination unit 212.

The comparison unit 211 may include a plurality of comparators 2110 to 2115. A reference voltage VF may be applied to a negative input terminal of each of the comparators 2110 to 2115, and a voltage obtained by dividing the driving voltage Vin by a resistor may be applied to a positive input terminal thereof. Thus, two resistors may be connected in series to each path, and a voltage detected at a node between resistors may be input to the positive input terminal of each of the comparators 2110 to 2115.

The comparators 2110 to 2115 may perform comparison operations and generate sampling signals COM0 to COM5.

For instance, when resistors R21 to R26 obey the relationship R26>R25>R24>R23>R22>R21, and a resistor Rref connected to the driving voltage Vin has a predetermined resistance which is the same for each path, the output sampling signals COM0 to COM5 may be changed from (000000) to (111111) with a rise in the driving voltage Vin.

In addition, the comparison unit 211 according to the present embodiment may be replaced by the comparison unit 112 according to the first embodiment. The number of serial resistors of the comparison unit 112 according to the first embodiment and the number of comparators may vary according to the number of output sampling signals.

The sampling signals COM0 to COM5 output by the comparison unit 211 may be supplied to the total current controller 240 and supplied to the logic combination unit 212.

The logic combination unit 212 may receive the sampling signals COM0 to COM5 output by the comparison unit 211 and perform logic operations on the sampling signals COM1 to COM5. As a result, the switch control signals SW1 to SW3 and the current control signals SC1 to SC4 may be generated.

The logic combination unit 212 may include a combination of logic devices that may be variously selected according to phases of the input sampling signals COM0 to COM5 and phases of output switch control signals SW1 to SW3 or current control signals SC1 to SC4. For example, the logic combination unit 212 may include a programmable logic array or programmable array logic.

Also, the number of sampling signals may not be specifically limited but may be variously selected according to the number of output switch control signals and the number of current control signals.

Figure 9:
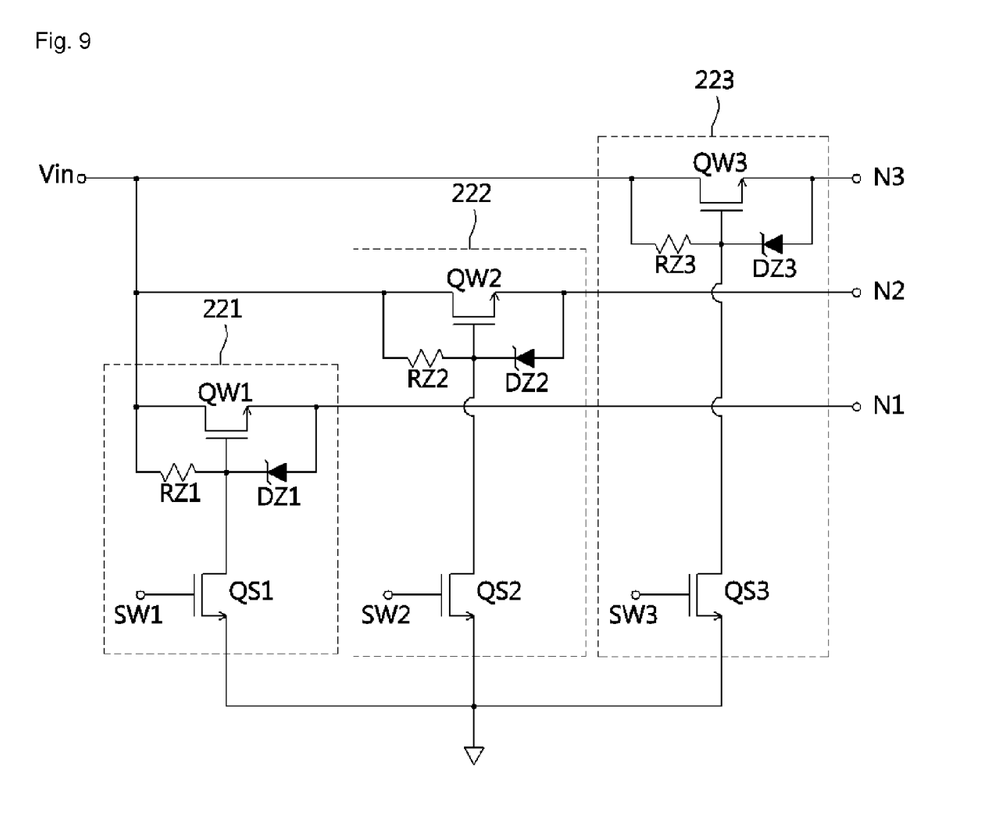
FIG. 9 is a circuit diagram of a switching unit according to the second example embodiment of the present invention.

FIG. 9 is a circuit diagram of the switch unit 220 according to the second example embodiment of the present invention.

Referring to FIG. 9, the switch unit 220 may include three switches 221, 222, and 223, and each of the switch units 221, 222, and 223 may include switches QW1 to QW3 and control transistors QS1 to QS3.

Each of the switch transistors QW1 to QW3 and the control transistors QS1 to QS3 may be a metal-oxide-semiconductor field effect transistor (MOSFET) and selectively have an n conductivity type or a p conductivity type. When each of the switch transistors QW1 to QW3 is an n-MOSFET, a drain terminal of the n-MOSFET may be connected to the driving voltage Vin, and resistors RZ1 to RZ3 may be connected between drain and gate terminals of the switch transistors QW1 to QW3. Also, zener diodes DZ1 to DZ3 may be provided between gate and source terminals of the switch transistors QW1 to QW3. When a surge voltage, which is a sudden high voltage, is applied to gate terminals of the zener diodes DZ1 to DZ3, the zener diodes DZ1 to DZ3 may be clipped to a constant level. Also, the switch transistors QW1 to QW3 may perform switch operations using the resistors RZ1 to RZ3 connected between the gate and drain terminals of the switch transistors QW1 to QW3 with the control transistors QS1 to QS3 cut off.

The control transistors QS1 to QS3 may be respectively connected between gate terminals of the switch transistors QW1 to QW3 and ground, and the switch control signals SW1 to SW3 may be applied to the gate terminals of the control transistors QS1 to QS3.

When the switch control signals SW1 to SW3 are enabled to a high level, the control transistors QS 1 to QS3 may be turned on. Thus, the gate terminals of the switch transistors QW1 to QW3 may be disabled to a low level. Accordingly, the switch transistors QW1 to QW3 may be turned off.

When the switch control signals SW1 to SW3 are disabled to a low level, the control transistors QS1 to QS3 may be turned off. Also, a voltage having a predetermined level may be applied to the switch transistors QW1 to QW3 due to resistors RZ1 to RZ3 connected between gate and drain terminals of the switch transistors QW1 to QW3. In particular, a current path including the driving voltage Vin and the resistors RZ1 to RZ3 may be cut off due to the cut-off control transistors QS1 to QS3. Thus, a voltage having substantially the same level as the driving voltage Vin may be applied to the gate terminals of the switch transistors QW1 to QW3. Accordingly, the switch transistors QW1 to QW3 of the switch unit 220 may be turned on.

For brevity, when a level of a switch control signal appropriate for turning on a switch transistor is applied, the switch control signal may be described as being enabled. Also, when a switch control signal appropriate for turning on the switch transistor is applied, the switch control signal may be described as being disabled.

When the switches 221, 222, and 223 are turned on, the driving voltage Vin may be applied to the LEDs L21, L22, L23, and L24 through the nodes N1, N2, and N3.

In addition, an operation of the illumination apparatus according to the present embodiment will be described with reference to Table 2.

Accordingly, a current path including the first node N1, the first LED L21, and the first driving current controller 231 may be formed due to the turned-on first switch 221, and the first LED L21 may perform a light emitting operation. Also, a current path including the first node N1, the second LED L22, and the second driving current controller 232 may be formed, a current path including the first node N1, the third LED L23, and the third driving current controller 233 may be formed, and a current path including the first node N1, the fourth LED L24, and the fourth driving current controller 234 may be formed. This means that the respective LEDs L21 to L24 are connected in parallel to one another and perform light emitting operations.

Furthermore, additional diodes may be provided between the respective nodes and the LEDs L21 to L24 to cut off the flow of a backward current between anode terminals and cathode terminals of the LEDs.

When the switch control signals SW1 and SW2 are enabled, the first switch 221 and the second switch 222 may be turned on. Thus, a driving voltage Vin may be applied to a first node N1 through the turned-on first switch 221, and the driving voltage Vin may be applied to a second node N2 through the turned-on second switch 222. Also, the enabled current control signals SC1 to SC4 may be applied to the first through fourth driving current controllers 231 to 234. Thus, the first through fourth driving current controllers 231 to 234 may be enabled. Also, target voltages Vt1 to Vt4 may be respectively applied to the driving current controllers 231 to 234. The target voltages Vt1 to Vt4 may have the same value.

Accordingly, a current path including the LED L21 and the first driving current controller 231 may be formed. The driving voltage Vin may be applied from the first node N1 to the current path, and the driving voltage Vin may be applied from the second node N2 to the current path. Also, a current path including the LED L22 and the second driving current controller 232 may be formed. Furthermore, the LED L23 may receive the driving voltage Vin from the first node N1 and receive the driving voltage Vin from the second node N2. Also, the LED L24 may receive the driving voltage Vin from the first node N1.

TABLE 2

| | First driving current controller 231 | Second driving current controller 232 | Third driving current controller 233 | Fourth driving current controller 234 | First switch 221 | Second switch 222 | Third switch 223 |
|---|---|---|---|---|---|---|---|
| VF ≤ Vin < 2VF | ON | ON | ON | ON | ON | OFF | OFF |
| | ON | ON | ON | ON | ON | ON | OFF |
| 2VF ≤ Vin < 3VF | OFF | ON | OFF | ON | OFF | ON | OFF |
| 3VF ≤ Vin | OFF | OFF | OFF | ON | OFF | OFF | ON |

Table 2 shows an example of the operation of the illumination apparatus of FIG. 7.

Initially, the switch control signal SW1 may be enabled, and the remaining switch control signals may be disabled. Thus, only the switch transistor QW1 may be turned on, and the first switch 221 may go into a conduction state. The driving voltage Vin may be applied through the switch transistor QW1 to the first node N1.

Also, the first through fourth driving current controller 231 through 234 may be enabled in response to the applied current control signals SC1 to SC4. In addition, the target voltages Vt1 to Vt4 may be applied by the total current controller 240 to the first through fourth driving current controllers 231 to 234. The target voltages Vt1 to Vt4 may have the same value.

Accordingly, when the switch control signals SW1 and SW2 are enabled and the respective driving current controllers 231 to 234 are enabled, the respective LEDs L21 to L24 may perform parallel light emitting operations. This means that the LEDs L21 to L24 are not affected by light emitting operations of other adjacent LEDs but independently perform light emitting operations at the same time.

Diodes D21 to D23 may be provided among the LEDs L21 to L24. The diodes D21 to D23 may be provided to cut off the flow of a backward current when a reverse bias is applied between anode terminals and cathode terminals of adjacent LEDs.

When the switch control signal SW2 is enabled, the second switch 222 may be turned on. Thus, the driving voltage Vin may be applied to the second node N2.

Also, the current control signals SC2 and SC4 may be enabled. Thus, the second driving current controller 232 and the fourth driving current controller 234 may be enabled. The target voltages Vt2 and Vt4 may be applied to the enabled driving current controllers 232 and 234. The applied target voltages Vt2 and Vt4 may have the same value.

A current path including the second node N2, the LED L21, the diode D21, the LED L22, and the second driving current controller 232 may be formed in response to the switch control signal SW2 and the current control signals SC2 and SC4. Also, the driving voltage Vin of the second node N2 may be applied to the current path, and the amount of current flowing through the current path may be determined by the target voltage Vt2 applied to the second driving current controller 232.

A current path including the LED L23, the diode D23, the LED L24, and the fourth driving current controller 234 may be formed parallel to the above-described current path. The driving voltage Vin of the second node N2 may be applied to the current path, and the amount of current flowing through the current path may be determined by the target voltage Vt4 applied to the fourth driving current controller 234.

The above-described operation may be enabled by a serial connection structure of two LEDs. Also, two serial connection structures may be provided and connected in parallel to each other.

In addition, when the switch control signal SW3 is enabled, the third switch 223 may be turned on. Thus, the driving voltage Vin may be applied to the third node N3 through the turned-on third switch 223.

Furthermore, the current control signal SC3 may be enabled and the remaining current control signals disabled. Thus, only the fourth driving current controller 234 may be enabled and perform a current drive operation. That is, a current path including the LED L21, the diode D21, the LED L22, the diode D22, the LED L23, the diode D23, the LED L24, and the fourth driving current controller 234 may be formed. The formed current path may include four LEDs connected in series. Current flowing through the current path may be determined by the target voltage Vt4 applied to the fourth driving current controller 234.

Due to the above-described operations, the LEDs can be directly and discretely driven by the driving current controller and connected in various forms to enable light emitting operations.

In the present embodiment, a target voltage determined by the total current controller can be applied to the driving current controller. The target voltage can determine the driving current of the driving current controller.

As described in the first embodiment with reference to FIGS. 5 and 6, the total current amount of the illumination apparatus can be set constant, and the currents flowing through respective current paths can be set constant. Therefore, power consumption can be appropriately divided, and the luminance of each of the LEDs can be controlled to be constant.

As explained thus far, in one embodiment of the present invention, an electrical connection relationship among a plurality of LEDs can be appropriately changed with fluctuations in the magnitude of an AC voltage for driving the plurality of LEDs so that all of the plurality of LEDs employed in the illumination apparatus can emit light. Thus, longer light emission by only some of the LEDs employed in the illumination apparatus, which leads to earlier deterioration of those LEDs compared to other LEDs, can be prevented.

In addition, when necessary, the total current supplied to all the LEDs can be controlled to be constant or current supplied to each of the LEDs can be controlled to be constant.

The invention claimed is:

1. An illumination apparatus, comprising:
a rectifier configured to receive alternating current (AC) power and generate a driving voltage in the form of a rectifying voltage;
a control signal generator configured to:
compare the driving voltage with a reference voltage to generate a sampling signal; and
perform a logic operation on the sampling signal to generate a switch control signal and a current control signal;
a switch configured to perform on/off operations in response to the switch control signal and selectively transmit the driving voltage;
a total current controller configured to receive the sampling signal and generate a target voltage as an analog signal;
a current controller configured to be enabled in response to the current control signal, the current controller comprising driving current controllers configured to determine a driving current using the received target voltage signal; and
a light emitting unit connected to the current controller, the light emitting unit comprising light emitting diodes (LEDs).

2. The illumination apparatus of claim 1, wherein in the light emitting unit, the LEDs are divided into:
a first light emitting group connected to the rectifier and configured to receive the driving voltage; and
a second light emitting group connected to the switch.

3. The illumination apparatus of claim 2, wherein the control signal generator is configured to generate the switch control signal, such that the LEDs of the first light emitting group are connected in series to the LEDs of the second light emitting group.

4. The illumination apparatus of claim 3, wherein the control signal generator is configured to generate the current control signal to enable only the driving current controller connected to a cathode terminal of an LED disposed at an end of a current path among the LEDs connected in series.

5. The illumination apparatus of claim 2, wherein the control signal generator is configured to generate the switch control signal, such that the LEDs of the first and second light emitting groups receive the driving voltage and are driven by the current controller and disposed parallel to each other.

6. The illumination apparatus of claim 5, wherein the control signal generator is configured to generate the current control signal to enable all the driving current controllers connected to the LEDs.

7. The illumination apparatus of claim 2, wherein the total current controller is configured to determine the target voltage according to a state of the switch control signal such that the total current flowing through all the LEDs is constant.

8. The illumination apparatus of claim 2, wherein the total current controller is configured to determine the target voltage according to a state of the switch control signal output by the control signal generator, such that the same current flows through the LEDs forming the respective current paths.

9. The illumination apparatus of claim 1, wherein the control signal generator is configured to generate the switch control signal to form a plurality of current paths in which the LEDs of the light emitting unit are connected in series.

10. The illumination apparatus of claim 9, wherein the control signal generator is configured to generate the current control signal to enable only the driving current controllers connected to a cathode terminal of an LED connected at an end of the LEDs.

11. The illumination apparatus of claim 1, wherein the control signal generator further comprises:
a comparison unit configured to divide the driving voltage and compare the divided driving voltage with a reference voltage to generate a sampling signal; and
a logic combination unit configured to perform a logic operation on the sampling signal to generate the switch control signal and the current control signal.

12. The illumination apparatus of claim 11, wherein the comparison unit comprises:
serial resistors connected in series, the serial resistors configured to divide the driving voltage; and
comparators configured to compare voltages of respective nodes between the serial resistors with the reference voltage, and generate sampling signals.

13. The illumination apparatus of claim 1, wherein each of the driving current controllers comprises:
a driving transistor comprising a drain terminal connected to cathode terminals of the LEDs;
a detection resistor comprising a source terminal connected to a source terminal of the driving transistor;
a linear amplifier configured to amplify a difference between a voltage of the detection resistor and the target voltage; and
a buffer configured to be enabled in response to the switch control signal and transmit an output of the linear amplifier to a gate terminal of the driving transistor.

14. The illumination apparatus of claim 1, wherein the light emitting unit is connected between the switch and the current controller.

* * * * *